US012692027B2

(12) United States Patent
Prampolini et al.

(10) Patent No.: US 12,692,027 B2
(45) Date of Patent: Jul. 28, 2026

(54) REUSABLE SPACE TRANSPORTATION SYSTEM

(71) Applicant: ARIANEGROUP SAS, Les Mureaux (FR)

(72) Inventors: Marco Prampolini, Le Haillan (FR); Alexis Bourgoing, Les Haillan (FR)

(73) Assignee: ARIANEGROUP SAS, Les Mureaux (FR)

( * ) Notice: Subject to any disclaimer, the term of this patent is extended or adjusted under 35 U.S.C. 154(b) by 0 days.

(21) Appl. No.: 18/254,479

(22) PCT Filed: Nov. 25, 2021

(86) PCT No.: PCT/FR2021/052094
§ 371 (c)(1),
(2) Date: May 25, 2023

(87) PCT Pub. No.: WO2022/112718
PCT Pub. Date: Jun. 2, 2022

(65) Prior Publication Data
US 2024/0010360 A1     Jan. 11, 2024

(30) Foreign Application Priority Data

Nov. 25, 2020   (FR) ...................................... 2012136

(51) Int. Cl.
| | |
|---|---|
| *B64G 1/62* | (2006.01) |
| *B64G 1/00* | (2006.01) |
| *B64G 1/40* | (2006.01) |

(52) U.S. Cl.
CPC ............. *B64G 1/623* (2023.08); *B64G 1/006* (2023.08); *B64G 1/40* (2013.01); *B64G 1/401* (2013.01); *B64G 1/62* (2013.01)

(58) Field of Classification Search
CPC .......... B64G 1/62; B64G 1/623; B64G 1/625; B64G 1/1071; B64G 1/12; B64G 1/14; B64G 1/2421; B64G 1/006
See application file for complete search history.

(56) References Cited

U.S. PATENT DOCUMENTS

| | | | | | |
|---|---|---|---|---|---|
| 3,118,636 | A | * | 1/1964 | Kantrowitz .............. | B64G 1/12 244/113 |
| 3,128,970 | A | * | 4/1964 | Tinajero ................. | B64G 1/625 244/100 R |

(Continued)

FOREIGN PATENT DOCUMENTS

| | | | | |
|---|---|---|---|---|
| RU | 2053168 C1 | * | 1/1996 | .............. B64C 1/14 |
| WO | 9813260 A1 | | 4/1998 | |

(Continued)

OTHER PUBLICATIONS

Search Report and Written Opinion issued in International Application No. PCT/FR2021/052094, mailed on Feb. 23, 2022.

(Continued)

*Primary Examiner* — Richard Green
(74) *Attorney, Agent, or Firm* — Bookoff McAndrews, PLLC

(57) ABSTRACT

A space transportation system intended to be mounted on a space launcher comprising a re-ignitable propulsion device and steerable flaps located at a second end and a monitoring unit, each flap comprising an actuating means configured to modify the orientation of said flap, said monitoring unit being configured to control the activation of the propulsion device and individually control the orientation of the flaps in order to implement the following steps:
    a launch step during which the propulsion device is off and the flaps are in a retracted position;

(Continued)

a return step during which the monitoring unit deploys the flaps and individually controls the orientation of the flaps to slow down the system, the propulsion device being off;

a landing step during which the monitoring unit controls the propulsion device and the actuating means to orient the flaps to slow down.

14 Claims, 5 Drawing Sheets

(56)                  References Cited

U.S. PATENT DOCUMENTS

| | | | | | |
|---|---|---|---|---|---|
| 3,232,560 | A * | 2/1966 | Moise | ...................... | B64G 1/62 |
| | | | | | 244/172.3 |
| 5,873,549 | A * | 2/1999 | Lane | ........................ | B64G 1/62 |
| | | | | | 244/3.28 |
| 7,195,207 | B2 * | 3/2007 | Rutan | .................... | B64G 1/625 |
| | | | | | 244/159.1 |
| 7,354,020 | B2 * | 4/2008 | Mueller | ................... | B64G 1/62 |
| | | | | | 244/158.1 |
| 8,408,497 | B2 * | 4/2013 | Boelitz | .................. | B64G 1/623 |
| | | | | | 244/158.9 |
| 8,844,876 | B2 * | 9/2014 | Prampolini | ............ | B64G 1/625 |
| | | | | | 244/158.9 |
| 9,487,308 | B2 * | 11/2016 | Featherstone | .......... | B64G 1/623 |
| 10,093,433 | B2 * | 10/2018 | Knudsen | ................ | B64G 1/625 |
| 11,377,234 | B2 * | 7/2022 | Lee | ........................ | B64G 1/401 |
| 11,754,368 | B2 * | 9/2023 | NakaMats | .............. | B64G 1/623 |
| | | | | | 89/1.8 |
| 11,926,439 | B2 * | 3/2024 | Baekby Bjarnoe | .... | B64G 1/641 |
| 2007/0012820 | A1 * | 1/2007 | Buehler | ................... | B64G 1/14 |
| | | | | | 244/158.9 |
| 2010/0314487 | A1 | 12/2010 | Boelitz et al. | | |
| 2019/0161214 | A1 * | 5/2019 | Kobayakawa | ........... | B64G 1/62 |
| 2021/0190013 | A1 * | 6/2021 | Zhao | ......................... | F02K 9/76 |
| 2024/0228068 | A1 * | 7/2024 | Balaj | ...................... | B64G 1/625 |

FOREIGN PATENT DOCUMENTS

| | | |
|---|---|---|
| WO | 2010141124 A1 | 12/2010 |
| WO | 2011005422 A2 | 1/2011 |

OTHER PUBLICATIONS

Search Report issued in French Application No. 20 121316, mailed on Jul. 28, 2021.

* cited by examiner

[Fig.1]
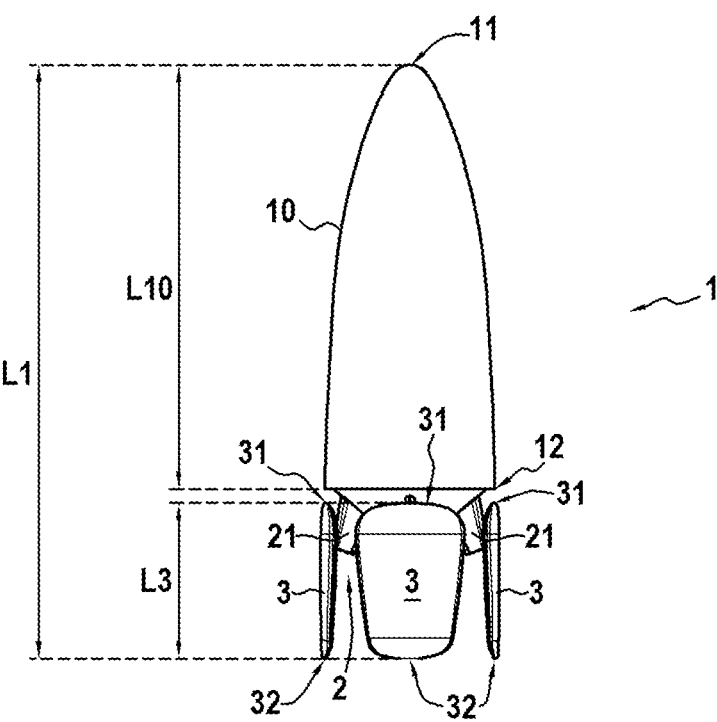
[Fig.2]
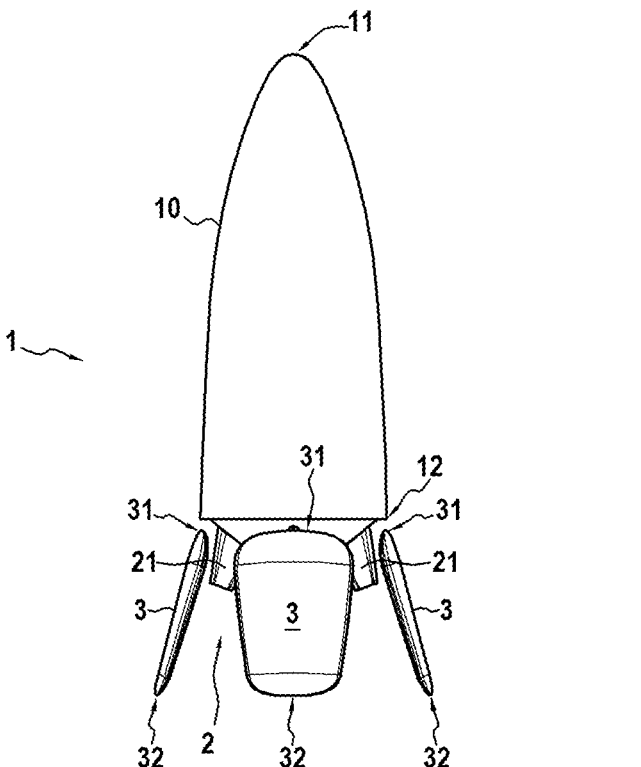

[Fig.3]
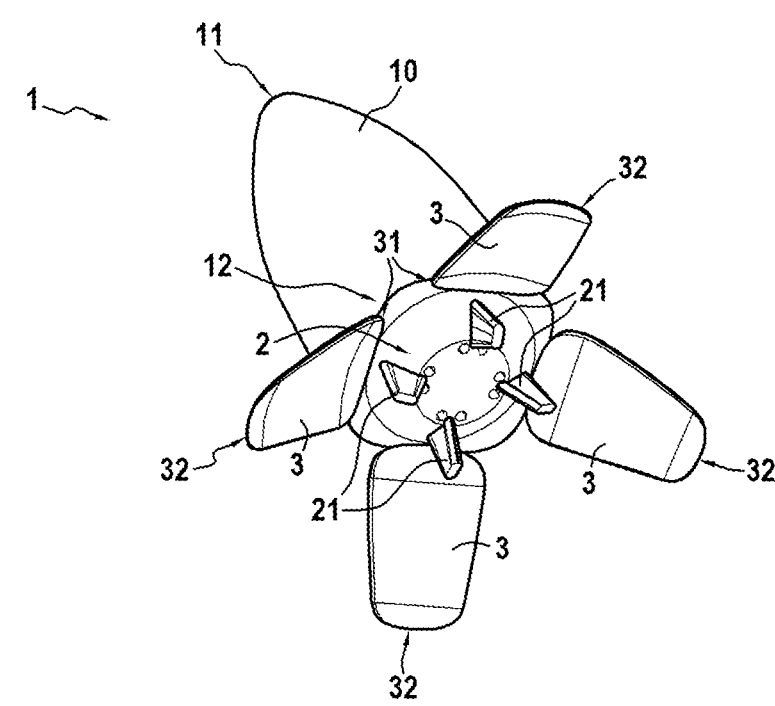
[Fig.4]
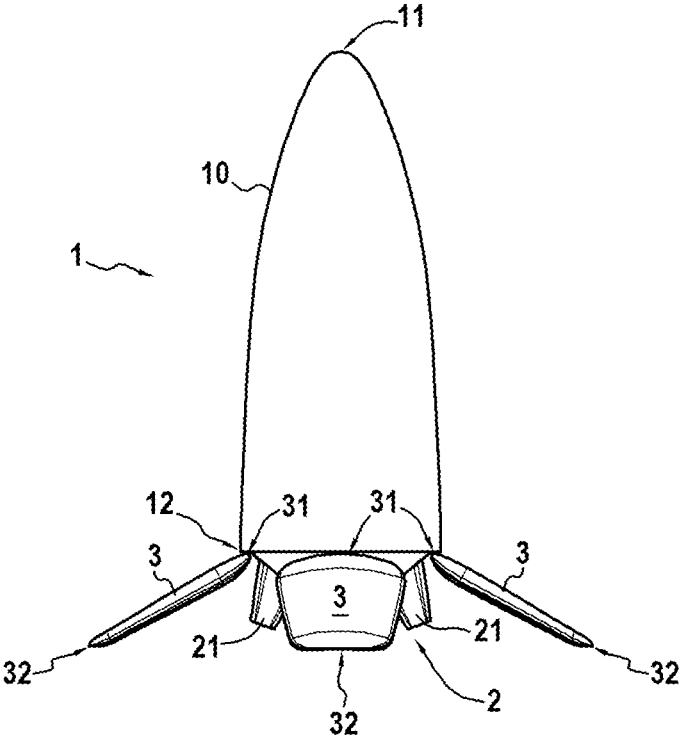

[Fig.5]
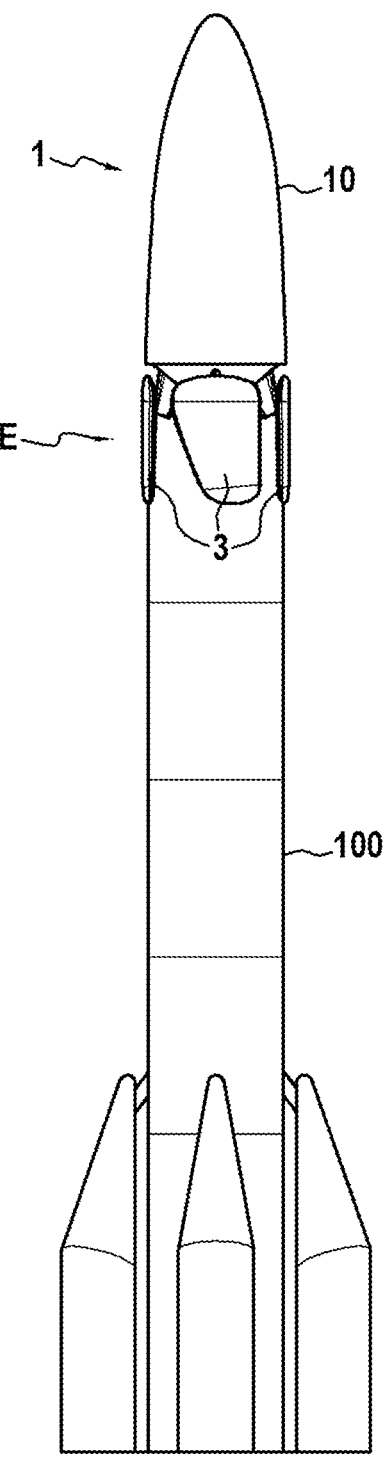

[Fig.6]
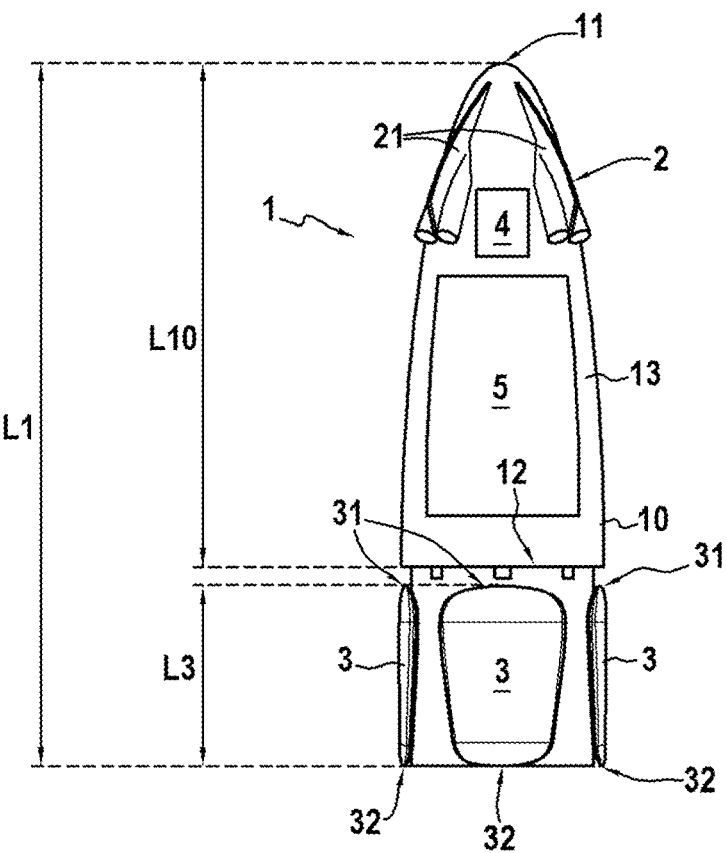
[Fig.7]
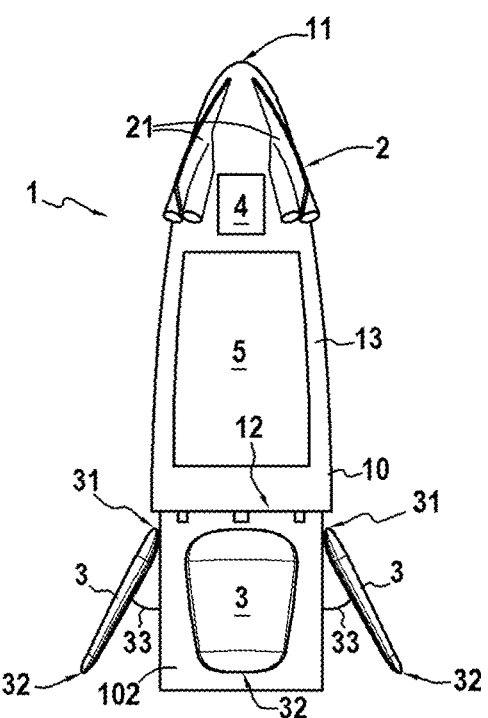

[Fig.8]
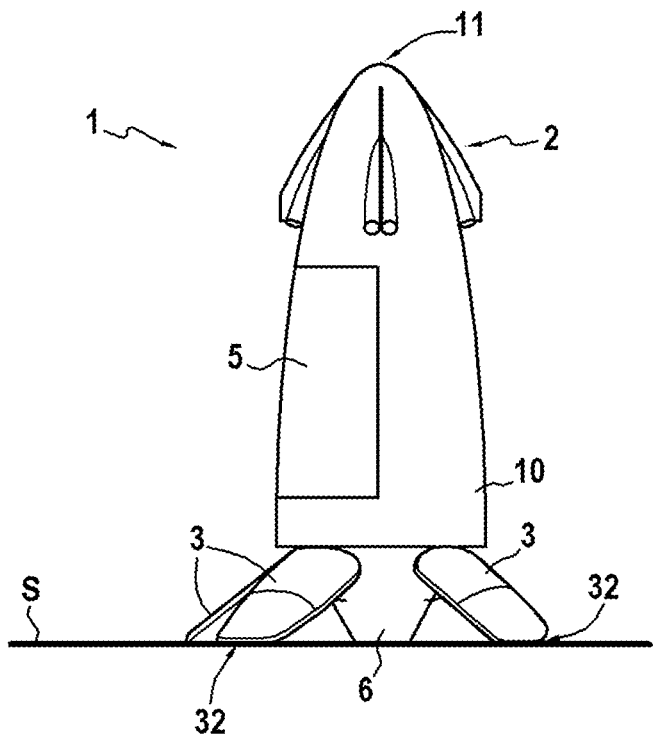

REUSABLE SPACE TRANSPORTATION SYSTEM

CROSS-REFERENCE TO RELATED APPLICATIONS

This is a National Stage Application under 35 U.S.C. § 371 of International Application No. PCT/FR2021/052094, filed Nov. 25, 2021, now published as WO 2022/112718 A1, which claims priority to French Patent Application No. 20 12136, filed on Nov. 25, 2020.

TECHNICAL FIELD

The invention relates to a reusable space transportation system intended to be installed on a space launcher.

PRIOR ART

Space launch missions are generally carried out by installing a transportation system which embarks a payload, for example a satellite to be put into orbit, on a space launcher. The transportation system thus forms the last stage of the launcher, the first stages being propulsion stages which are detached once their mission has been carried out.

A problem generally encountered by the known transportation systems is that they can only be used once, that is to say for a single launch and a single landing on earth.

In order to solve this problem, a reusable transportation system or a reusable shuttle has been developed. A reusable transportation system is capable of landing in a predetermined location at the end of its mission in order to be able to recover the transportation system, and put the transportation system back into the operating state for a future mission.

A problem encountered by the reusable transportation systems is to be capable of controlling with sufficient accuracy the orientation and the speed of the transportation system to allow the transportation system to return from space to land at the desired location.

The solution for controlling the orientation and the speed of the transportation system must also be robust enough to withstand the stresses undergone during the use of the transportation system, and allow the transportation system to be reused for a next mission.

DISCLOSURE OF THE INVENTION

The main aim of the present invention is therefore to propose a transportation solution making it possible to solve the problems described above.

According to a first aspect, the invention relates to a space transportation system intended to be mounted on a space launcher. The transportation system comprises a fuselage extending mainly along a first direction, a first end, a second end opposite to the first end along the first direction, and a re-ignitable propulsion device located on said first end or on said second end.

According to a general characteristic of the invention, the transportation system comprises a plurality of steerable flaps located at said second end and a control unit. Each flap comprises an actuating means configured to modify the orientation of said flap at least in a plane including the first direction. Said control unit is configured to control the propulsion device and individually control each actuating means to control the orientation of each of the flaps in order to implement the next steps:

a launch step during which the propulsion device is off and the flaps are in a retracted position;

a return step during which the control unit controls the actuating means to deploy the flaps and orient them to ensure the stability and pilot the system, the propulsion device being off;

a landing step during which the control unit controls the propulsion device and the actuating means to orient the flaps to slow down and perform a rollover of the transportation system.

Such a transportation system is in particular advantageous because it offers a simple and robust solution for a reusable transportation system, suitable for all the phases of the mission of the transportation system.

The fuselage of the transportation system has a simple aerodynamic profile, that is to say without airfoils, which makes it possible to minimize the constraints of design of the launcher while maximizing the internal volume of the reusable space transportation system since there is no need to use an aerodynamic external fairing.

This simple profile is similar to the profile of the fairing of a previously used non-reusable shuttle. This profile thus makes it possible to have a transportation system that can be adapted to current launchers without the need to make any modification to the design of the known launchers and used with this type of shuttle profile.

According to one possible characteristic, the flaps are located at a distance from the fuselage of the transportation system whatever the step. The flaps are preferably remote from the fuselage along the first direction in the launch step. The flaps are thus offset relative to the fluid flow on the fuselage.

The distancing of the flaps from the fuselage makes it possible to absorb the aerodynamic boundary connection layer and thus to maximize the aerodynamic efficiency of the outer surface of the transportation system whatever the speed regime (and Mach) of the transportation system.

According to one possible characteristic, the means for actuating the flaps are curved actuators. They can describe a movement along a circular direction or form a ball joint allowing additional pivoting in two distinct planes.

According to one possible characteristic, the system comprises four (3 or more) flaps distributed according to an axial symmetry around the first direction.

According to one possible characteristic, the propulsion device comprises a plurality of exhaust nozzles distributed on the fuselage of the system along a circumferential direction around the first direction and which are directed towards the second end of the system and between the flaps or along a direction parallel to the first direction and passing between two flaps for each exhaust nozzle.

According to one possible characteristic, the propulsion device generates a thrust that is variable in terms of intensity and direction and controlled by the control unit.

According to one possible characteristic, the flaps have, along the first direction and in the configuration of the launch step, a length comprised between 40% and 60% of the length of the fuselage of the system.

Flaps with such a ratio of dimensions with the transportation system make it possible to optimize the control of stability, direction and deceleration of the transportation system.

According to one possible characteristic, in which each flap comprises a first end directed towards the first end of the system during the launch step and a second end directed towards the second end of the system during the launch step, and the transportation system is configured to rest, at the end of the landing step, on a reference surface, such as a landing base, by contact with the second end of the flaps to increase the stability on the ground upon landing.

According to one possible characteristic, the system comprises at least one central leg located at the second end of the system and surrounded by the flaps, the transportation system being configured to rest, at the end of the landing step, on the reference surface via the central leg and via the second end of the flaps which make it possible to increase the stability on the ground of the transportation system. The flaps therefore do not take up most of the weight, but serve as additional bearing like stands.

According to one embodiment of the invention, the propulsion device is mounted on the first end of the fuselage. This configuration makes it possible to maximize the decoupling between the transportation system and the launcher in the launch phase and, in the reentry phase, to minimize the interactions of the jets with the aerodynamic controlling surfaces and the ground, to reduce the hot recirculation gas flows in the landing phase, and move the center of gravity back in the final rollover phase, thus making it possible to help the rollover maneuver and the stabilization of the transportation system in the configuration on the ground.

According to another embodiment, the propulsion device is mounted on the second end of the fuselage. This configuration makes it possible to avoid any particular processing of the nozzles by protective caps for protection against the thermal environments. Furthermore, it allows, for the launch phase, to have protection of the propulsion device by the mechanical interface between the transportation system and the launcher. In the reentry phase, this configuration makes it possible to avoid any impact of the propulsion jets on the fuselage or on the extrados face of the aerodynamic flaps, to protect the propulsion device from the aerothermal reentry environments, and to achieve favorable segregation between the aircraft systems.

According to a second aspect, the invention relates to an assembly comprising a system according to any one of the preceding characteristics installed on a space launcher.

BRIEF DESCRIPTION OF THE DRAWINGS

Other characteristics and advantages of the present invention will emerge from the description given below, with reference to the appended drawings which illustrate an example of embodiment devoid of any limitation.

FIG. 1 schematically represents a perspective view of a transportation system in flight according to a first embodiment with the flaps in the retracted position for the launch step.

FIG. 2 schematically represents a perspective view of the transportation system of FIG. 1 in flight with the flaps in the semi-deployed position for the atmospheric entry step.

FIG. 3 schematically represents a perspective view of the transportation system of FIG. 1 with the flaps in the deployed position for the landing step.

FIG. 4 schematically represents the transportation system of FIG. 3 when it is on the ground after landing.

FIG. 5 schematically represents the transportation system of FIG. 1 installed on a space launcher.

FIG. 6 schematically represents a perspective view of a transportation system in flight according to a second embodiment with the flaps in the retracted position for the launch step.

FIG. 7 schematically represents a perspective view of the transportation system of FIG. 6 in flight with the flaps in the semi-deployed position for the atmospheric entry step.

FIG. 8 schematically represents a perspective view of the transportation system of FIG. 6 when it is on the ground after landing.

DESCRIPTION OF THE EMBODIMENTS

As illustrated in FIGS. 1 to 8 illustrating two embodiments of a transportation system 1 according to the invention, a transportation system 1 comprises a propulsion device 2, a plurality of flaps 3 and a fuselage 10 extending mainly along a main direction X between a first end 11 and a second end 12 opposite to the first end 11. The first end 11 of the fuselage 10 is considered to be the end located at the front of the transportation system 1 when it is in flight, and the second end 12 of the fuselage 10 is considered to be the end located at the rear of the transportation system 1 when it is in flight. When the transportation system 1 is mounted on a launcher 100 as illustrated in FIG. 6, the first end 11 is free at the front, and the second end is in contact with the launcher 100.

In the embodiment illustrated in FIGS. 1 to 5, the propulsion device 2 is located on the second end 12. In a second embodiment illustrated in particular in FIGS. 7 to 10, the propulsion device 2 can be mounted on the first end 11.

In the two embodiments illustrated in FIGS. 1 to 5 and 6 to 8, the flaps 3 are coupled to the second end 12 of the fuselage 10 of the transportation system 1. The flaps 3 are of essentially identical shape in a plane of symmetry comprising the main direction and a direction orthogonal to the main direction, when the flaps are in the configuration relating to the launch step defined below.

The fuselage 10 is streamlined with a substantially increasing cross-section in the longitudinal direction. The fuselage 10 can thus for example give an ogival shape to the transportation system 1 devoid of airfoils, the first end 11 being tapered.

The flaps 3 extend along the main direction X between a first end 31 and a second end 32 opposite to the first end 31. The first end 31 is disposed facing the second end 12 of the fuselage 10. And, when the transportation system 1 is in configuration relating to the launch step, the first end 31 and the second end 32 are aligned along a direction parallel to the main direction X.

Each flap 3 is fixed to the fuselage 10 via an actuator 33 forming an articulated connection, provided with a ball joint for example at its end cooperating with the flap 3, making it possible to modify the orientation of the flap 3 along different directions.

Thanks to the actuator 33, the flaps 3 are movable between a retracted position and a deployed position. The retracted position is used in particular during the launch step and illustrated in FIGS. 1 and 6, in which the flaps 3 are oriented to be in the extension of, or parallel to, the fuselage 10 of the transportation system 1 and offer the lowest possible, even zero, resistance to the fluid flow flowing over the fuselage 10. The deployed stop position, illustrated in FIGS. 3, 4 and 8 is used in particular during the landing step. In this position, said flaps 3 are deployed and protrude out of the profile of the fuselage 10.

The flaps 3 are not limited to two positions, and can individually be in any position between the retracted position and the deployed stop position, including according to complex degrees of freedom. FIGS. 2 and 7 in particular schematically illustrate the transportation system 1 with the flaps 3 in a semi-deployed position for an atmospheric re-entry step.

The actuator 33 is thus configured to offset the flap 3 relative to the fuselage 10 regardless of the step in which the transportation system 1 is located. The actuator 33 thus makes it possible to offset the flap 3 relative to the fuselage 10 at any time along the main direction X and/or along a direction contained in a plane orthogonal to the main direction X.

In the launch step, the flaps 3 can thus be disposed in the main extension X of a space separating the first end 31 of each flap 3 from the second end 12 of the fuselage 10 as illustrated in FIG. 1 for the first embodiment and in FIG. 6 for the second embodiment.

As illustrated in FIG. 8 illustrating the transportation system 1 according to the second embodiment in a configuration relating to the landing step, the actuator 33 can comprise a rounded mechanical arm allowing the flap to pivot between its retracted position and its deployed position. It can comprise a ball joint also placed between the curved mechanical arm and the flap 3 which makes it possible to modify the orientation of the flap 3 relative to the mechanical arm.

The first end 31 of the flaps 3 is therefore disconnected from the fuselage 10 and located at a distance from said fuselage 10 of the transportation system 1, which makes it possible to adopt the complex degrees of freedom of deflection of the flaps 3 according to the needs related to the mechanics of the flight, to guarantee optimum operation of the flaps 3 over all the flight phases encountered during the atmospheric re-entry and to limit the interactions between the flaps 3 and the fuselage 10 as illustrated in FIGS. 2 and 7 in particular.

In the two embodiments illustrated in FIGS. 1 to 8, the system 1 comprises four identical flaps 3 which are distributed homogeneously about the main direction X. The number of flaps 3 may vary according to the embodiments but is at least equal to three.

The transportation system 1 also comprises a control unit 4 which is configured, on the one hand, to control the propulsion device 2, and more particularly the activation of the propulsion device 2 and, on the other hand, to control the orientation of each flap 3 individually by controlling the actuators 33. The control unit 4 thus controls the ignition of the propulsion device 2 and the orientation of the flaps 3 in order to control the speed, the orientation and the trajectory of the transportation system 1 in order to implement a predetermined scenario which depends on the mission to be conducted by said transportation system 1. The control unit 4 thus allows the transportation system 1 to perform a rollover during its descent to Earth just before landing. The control unit 4 can also carry out a management of the slowdown and/or acceleration of the system 1 according to the needs of the mission. The control unit 4 also makes it possible to guide the transportation system 1 towards the desired landing area.

The control unit 4 is in particular configured to implement a launch step, then a step of return from space, then a landing step.

During the launch step, the transportation system 1 is installed on a space launcher 100 as illustrated in FIG. 5, the propulsion device 2 is off and the flaps 3 are in their retracted position in order to limit the overall dimension of the transportation system 1 and the interactions on the launcher 100.

During the return step, the transportation system 1 returns to Earth so that it can be recovered. During the return step, the control unit 4 controls the actuators 33 in order to deploy the flaps 3 in a position making it possible to ensure the stability, the slowdown and the piloting of the system 1 in its fall towards the Earth, as is illustrated in FIGS. 2 and 7, the propulsion device 2 being off. During this step, the deployment of the flaps 3 by the control unit 4 via the actuators 33 makes it possible to achieve a slowdown by aerodynamic dissipation of the kinetic energy in the Earth's atmosphere. In addition, the control unit 4 can adapt the orientation of each flap 3 individually in order to adapt the trajectory of the system 1 to rectify any deviations that may occur.

During the landing step, the system 1 performs a rollover maneuver and continues to slow down in order to stop on the ground. In order to perform the rollover of the system 1, the control unit 4 activates the propulsion device 2 and adapts the orientation of the flaps 3 using the actuators 33. Furthermore, once the system 1 has rolled over, that is to say when the second end 12 of the fuselage 10 of the system 1 is directed towards the ground, the control unit 4 activates the propulsion device 2 in order to slow down the system 1, in particular to place the flaps 3 in a retracted stop position as illustrated in FIGS. 3 and 4 for the first embodiment and in FIG. 8 for the second embodiment.

The actuators 33 can be actuated to have asymmetrical positions of the flaps 3, in particular for the rollover phase. The flaps 3 are controlled independently of each other to allow such a rollover each having different angles, unlike the launch position and the landing position in which the flaps 3 are positioned symmetrically with respect to the main axis X.

In the two embodiments illustrated in FIGS. 1 to 8, the flaps 3 can have a length L3 which is comprised between 20% and 40% of the length L1 of the system 1 when the flaps 3 are in the retracted position in the extension of the fuselage 10 of the system 1. In other words, in the retracted position, the length L3 of the flaps 3 measured along the main direction X can be comprised between 40% and 60% of the length L10 of the fuselage 10, and preferably about 50% of the length L10 of the fuselage 10, as illustrated in FIGS. 1 and 6.

The transportation system 1 comprises a capacity for carrying a payload. The payload can for example comprise one or more artificial satellites to be put into orbit. The payload can also comprise passengers and all the systems for aborting and preserving the mission that are required for passenger transportation, as well as the space life-support systems. The transportation system 1 can in particular embark both one or more satellites and passengers.

In both embodiments, the transportation system 1 can comprise a hatch 5 located on a central area 13 of the fuselage 10 located between the first end 11 and the second end 12, as illustrated in FIGS. 6 to 8, said hatch 5 being movable between an open position in which a cargo space is accessible, and a closed position in which the cargo space is closed. The hatch 5 makes it possible to embark the payload, protect it during transportation, then the hatch 5 can open when the payload must be released.

Thus, according to one possible implementation, when a satellite is loaded in the cargo space located in the central area 13 and which is closed by the hatch 5, the hatch 5 can open when the transportation system 1 has reached the transfer orbit of said satellite in order to position the satellite in a station, the satellite then being able, for example, to use its apogee motor in order to move up to its working orbit. Once the satellite is positioned in a station, the control unit 4 controls the propulsion device 2 and the flaps 3 in order to ensure a return to Earth of the system 1 and in order to perform the maneuvers for a landing on the desired landing area.

According to another possible implementation, the hatch 5 is only open for the embarking and disembarkation of the passengers before takeoff and after landing and during the orbital flight phases.

Preferably, the propulsion device 2 generates a thrust which is variable, so that the control unit 4 can adapt the amount of thrust generated by the propulsion device 2 when the propulsion device 2 is activated by said control unit 4.

The propulsion device 2 can for example be a liquid or hybrid propellant rocket engine.

In the first embodiment illustrated in FIGS. 1 to 5, the propulsion device 2 of the transportation system 1 is disposed on the second end 12 of the fuselage 10. In this first embodiment, the propulsion device 2 comprises four exhaust nozzles 21 placed on the bottom of the transportation system 1. The exhaust nozzles 21 are thus disposed in a space comprised between the flaps 3 when they are in the retracted position.

In the second embodiment illustrated in FIGS. 6 to 8, the propulsion device 2 comprises a plurality of exhaust nozzles 21 which are distributed over the contour of the fuselage 10 of the transportation system 1 at the level of the first end 11, and more particularly on the outer surface of the fuselage 10. The exhaust nozzles 21 are directed towards the second end 12 of the fuselage 10 of the system 1 and are each located along an axis parallel to the main direction X and passing between two flaps 3. Thus, the flaps 3 are not reached by the exhaust stream leaving the propulsion device 2.

As illustrated in FIG. 8, at the end of landing, the flaps 3 can serve as an additional support ensuring an increment of stability on the ground upon landing for the transportation system 1. Thus, the flaps 3 can be in a landing position in which all the flaps 3 are in their deployed stop position, the system 1 resting on a reference surface S, generally the ground, by the second end 32 of the flaps 3.

The system 1 can further comprise at least one central leg 6 located between the flaps 3 at the level of the second end 12 as illustrated in FIG. 8. The shape of the central leg(s) 6 is adapted so that the system 1 rests on the reference surface S both by the second end 32 of the flaps 3 and by the central leg(s) 6 when the flaps 3 are in the landing position.

As illustrated in FIG. 5, the transportation system 1 can be installed on the space launcher 100 to form an assembly E.

In FIGS. 6 and 7, a portion 102 of one of the casings of the space launcher 100 is visible, this casing being intended to be unhooked from the transportation system 1 at the end of the launch.

The invention thus makes it possible to provide a reusable transportation system capable of controlling its orientation and speed with sufficient accuracy to allow it to return from space to land at the desired location, and robust enough to withstand the stresses undergone during the flight.

The invention claimed is:

1. A space transportation system intended to carry a payload and be mounted on a space launcher, the transportation system comprising a fuselage extending mainly along a first direction, a first end, a second end opposite to the first end along the first direction, and a re-ignitable propulsion device located on said first end or on said second end, wherein the transportation system comprises a plurality of steerable flaps located at said second end and a control unit, the flaps being located at a distance of the fuselage of the transportation system whatever the step such that a first end of each flap closest to the second end of the fuselage is disconnected from the second end of the fuselage, each flap comprising an actuating means configured to modify an orientation of said flap at least in a plane parallel to the first direction, wherein each actuating means includes a mechanical arm configured to pivot each respective flap around a second direction perpendicular to the first direction, and said control unit being configured to control the propulsion device and individually control each actuating means to control the orientation of each of the flaps in order to implement:
  a launch step during which the propulsion device is off and the flaps are in a retracted position;
  a return from space step during which the control unit controls the actuating means to deploy the flaps and orient them to ensure stability and pilot the transportation system, the propulsion device being off;
  a landing step during which the control unit controls the propulsion device and the actuating means to orient the flaps to slow down and perform a rollover of the transportation system, wherein each of the respective flaps can be pivoted around the second direction during the rollover of the transportation system.

2. The system according to claim 1, wherein the flaps being remote from the fuselage along the first direction in the launch step.

3. The system according to claim 1, wherein the means for actuating the flaps are actuators configured to maintain the flaps offset from the fuselage.

4. The system according to claim 1, wherein the plurality of steerable flaps comprises four flaps distributed according to an axial symmetry around the first direction.

5. The system according to claim 1, wherein the propulsion device comprises a plurality of exhaust nozzles distributed on the fuselage of the system along a circumferential direction around the first direction and which are directed towards the second end of the system and between the flaps or along a direction parallel to the first direction and passing between two flaps for each exhaust nozzle.

6. The system according to claim 1, wherein the propulsion device generates a thrust that is variable in terms of intensity and direction and controlled by the control unit.

7. The system according to claim 1, wherein the flaps have, along the first direction and in the configuration of the launch step, a length comprised between 40% and 60% of the length of the fuselage of the transportation system.

8. The system according to claim 1, wherein each flap comprises a first end directed towards the first end of the system during the launch step and a second end directed towards the second end of the system during the launch step, and the system is configured to rest on the reference surface by contact with the second end of the flaps at the end of the landing step.

9. The system according to claim 8, wherein the system comprises at least one central leg located at the second end of the system and surrounded by the flaps, the system being configured to rest on the reference surface by contact with the second end of the flaps and the central leg at the end of the landing step.

10. An assembly comprising a transportation system according to claim 1 installed on a space launcher.

11. The system according to claim 1, wherein the system comprises a hatch housing the payload, wherein the hatch is located between the first end and the second end.

12. The system according to claim 1, further comprising at least one leg located between the flaps at a level of the second end.

13. The system according to claim 12, wherein the transportation system is configured to rest on the reference surface by contact with the second end of the flaps and the at least one leg at the end of the landing step.

14. The system according to claim 1, wherein during the rollover of the transportation system, the second ends of each of the respective flaps face a reference surface.

\* \* \* \* \*